(No Model.)

G. P. CLEVELAND.
ROTARY PLOW.

No. 455,170.  Patented June 30, 1891.

Witnesses.
Rhet Everett.
Dennis Sumby.

Inventor.
George P. Cleveland.
By James L. Norris.
Atty.

UNITED STATES PATENT OFFICE.

GEORGE P. CLEVELAND, OF COLEMAN, TEXAS.

ROTARY PLOW.

SPECIFICATION forming part of Letters Patent No. 455,170, dated June 30, 1891.

Application filed January 24, 1891. Serial No. 379,184. (No model.)

*To all whom it may concern:*

Be it known that I, GEORGE P. CLEVELAND, a citizen of the United States, residing at Coleman, in the county of Coleman and State of Texas, have invented new and useful Improvements in Rotary Plows, of which the following is a specification.

My invention relates to that class of agricultural mechanism used for breaking, comminuting, and turning the soil, and especially to that type of apparatus commonly known as "subsoiling-plows."

It is the purpose of my invention to provide a novel machine which may be used either to break, pulverize, and mix the soil or as a subsoil-plow, or, on the other hand, be converted by a simple and easy change into a cultivator. It is the purpose of my said invention, also, to provide a novel gang-plow capable of cutting the soil at different depths, as circumstances may require, and in which the angle at which the plows enter the soil may be varied.

It is my further purpose to provide a gang-plow in which the separate rotating shares shall be detachable from their revolving drive shanks or shafts and connected therewith in such a manner that if one of said shares encounters an obstruction which can neither be dislodged or broken up the share will yield and move backward in the line of its axis of rotation, preventing its fracture and avoiding dangerous strain upon the machinery driving the shares.

It is my object, finally, to provide a novel apparatus of the character described wherein the revolving shares may all be raised or lowered either to enter the soil at different angles or to be entirely withdrawn from it, and to so construct and organize the parts of the plow that the shares may be projected to enter the soil when the axis of rotation forms a small angle with the line of draft and to penetrate to the depth desired.

The invention consists to these ends in the several novel features of construction and new combinations of parts hereinafter fully set forth, and then definitely pointed out in the claims which follow this specification.

To enable others skilled in the art to which my invention appertains to make, construct, and use the same, I will proceed to describe it in detail, reference being had to the accompanying drawings, in which—

Figure 1:
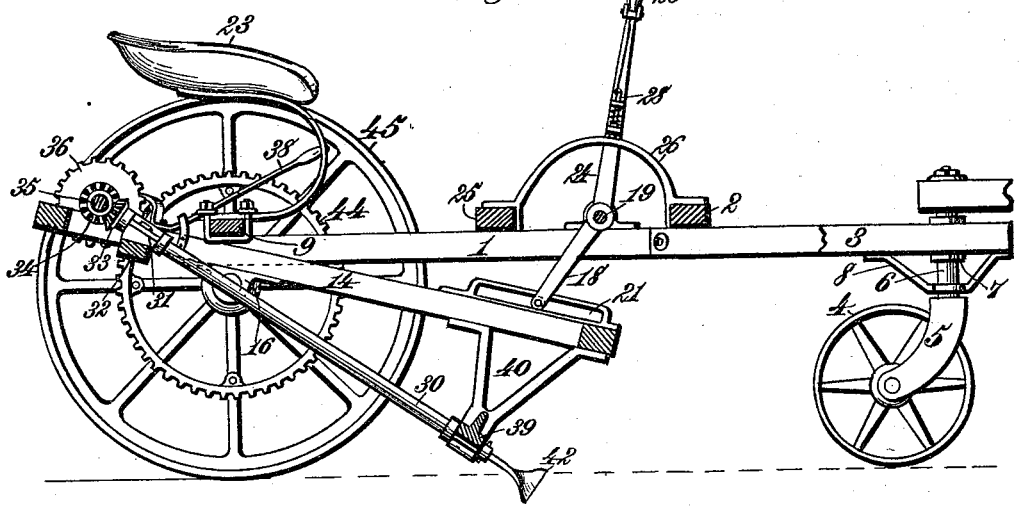
Figure 2:
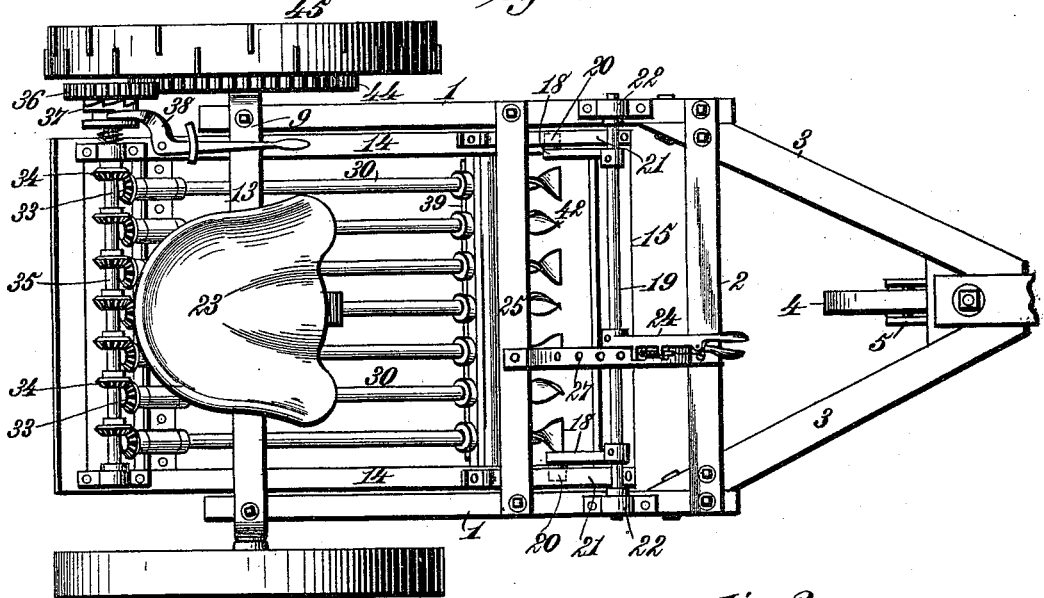
Figure 3:
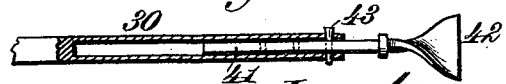
Figure 4:
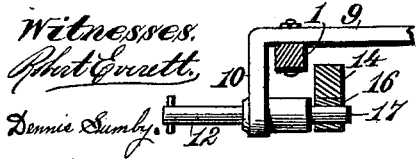

Figure 1 is a vertical section of a mechanism embodying my invention, the line of section extending from front to rear thereof. Fig. 2 is a plan view of the entire plow. Fig. 3 is a detail view, partly in section, of one of the shares with part of its shaft, showing the manner of connecting the parts. Fig. 4 is a detail section of one side of the main frame of the plow, showing the pivoted frame for the shares and their shafts, the driving mechanism, and the manner of connecting the frames with the axle.

The main frame of the plow shown in said drawings is substantially rectangular in form, and consists of two side beams 1 and a cross-beam 2 at the forward end of the frame, to which converging beams 3 are bolted. At the apex of these beams is arranged the steering-wheel or caster-wheel 4, journaled within a bifurcated frame 5, from which rises a standard 6, passing through the end of the frame, which rests upon a collar 7 on the standard. The latter is still further braced by a metal bracket 8, bolted to the lower surface of the frame and resting upon the shoulder formed by the top of the bifurcated wheel-support 5. The tongue has a mortise at its rear end, which receives the tenon formed on the upper projecting end of the standard 6 and fastened by a nut.

At or near the rearward end of the two side beams 1 is placed the transverse axle 9, bolted to the side beams and having its ends bent downward at right angles with the main portion, as shown in Fig. 4, and dropped a little below the beams of the frame. At the lower ends of these drop-arms 10 are formed or mounted the journals 12, which project from the outer faces of the drop-arms. The main portion 13 of the axle extends from one side to the other of the frame. Upon the said axle 13 is mounted the swing-frame for carrying the plows, consisting of a rectangular structure formed of side beams 14 and end bars 15. To the lower faces of the former are bolted bracket-bearings 16, which engage the axle, as shown in Figs. 1 and 4, their points of engagement being just within lugs 17, whereby the plow-carrying frame lies within the side beams of the main frame, as shown in Figs. 2 and 4. The bracket-bearings 16 are placed between the middle part of the side beams 14 and their ends, and the frame projects some distance in rear of the axle 13. Its forward end is sustained by means of swing-arms 18, which hang from a rock-shaft 19, their lower ends being provided with outwardly-turned journals or studs carrying friction-rolls 20, which lie beneath keepers 21, bolted to the upper surface of the side beams 14 and having such length as to permit the required travel of said rolls in the channels formed by the keepers. The rock-shaft 19 is journaled in bearings 22, mounted on the side beams 1 of the main frame. At a suitable point upon this shaft, within convenient reach of the driver's seat 23, a lever 24 is mounted, and close by said lever and supported upon the front cross-beam 2 and a parallel beam 25 is a curved bar 26, having at suitable intervals openings 27, with which a locking-pin engages, said pin being carried by a spring-actuated bar 28, movable in lugs upon said lever and withdrawn from the openings in the curved bar or plate 26 by a cam-handle 29, similar in all essential respects to the locking device employed upon the reversing-bar of a locomotive.

Upon the plow-carrying frame are arranged a series of shafts 30, supported at their rear ends in boxes 31, which rest upon a transverse beam 32, secured to the under side of the frame near its rear end. Upon the rearward projecting ends of these shafts are mounted similar miter-gears 33, which mesh with a series of miters 34, carried by a shaft 35, the bearings thereof being arranged upon the side beams 14 of the frame. One end of this shaft is prolonged to extend beyond the side bar, and upon its end is mounted a spur-gear 36, which is normally loose on the shaft, but may be locked therewith by means of a clutch 37, which is splined upon the shaft and operated by a clutch-lever 38, having its fulcrum upon the side bar 14, its forked end running in a circumferential channel in the clutch. The forward ends of the shafts 30 rest in bearings 39, which are supported by brackets 40, bolted to the lower face of the plow-carrying frame at or near its forward end. The forward ends of said shafts project slightly beyond or in front of the series of bearings 39, and for some distance these ends are tubular, as shown in Fig. 3. Within the tubular ends of these shafts are inserted the shanks 41 of the plows, the latter consisting of rotary shares 42, resembling in their form the cutting end of an auger, but of a diameter and strength suited to the work they are to perform. The shanks 41 of the plows are longitudinally adjustable in the tubular shafts 30, and in order to fasten them at any point to which they may be projected pins 43 are inserted in apertures in the ends of the shafts and passed through the shank, which is provided with a series of openings to permit various adjustments. In order that the torsional strain may be thrown wholly upon this pin, the opening in the shaft and the shank fitting said opening are of circular form, whereby rotary movement of the shank within the shaft shall be possible whenever the connection formed by the pin 43 is removed or destroyed.

The pins 43 are of such material and dimensions that they constitute "break-pins," the purpose being that should any one or more of the plows encounter an obstruction which can neither be penetrated, broken up, or dislodged the pin will snap under the torsional strain imposed on the shank, whereby the plow will cease to revolve and the shank will telescope or pass into the shaft, retracting the rotary share, and either allowing it to withdraw from the ground or to pass over the obstruction.

Rotary motion is imparted to the shafts 30 from the transverse shaft 35 by means of a gear-annulus 44, mounted on the wheel 45, which is provided with teeth or corrugations upon its periphery to prevent it from slipping.

I intend to impart a twist to the plows between their cutting points or ends and their shanks of any desired length, according to the character of the work to be done. This twist closely resembles that in any wood-auger, and is valuable in breaking the soil and pulverizing and mixing the same.

By adjusting the position of the lever the plow-carrying frame may be variously inclined, whereby the plows will act upon the soil in lines forming greater or smaller angles with the line of draft. When operating upon very hard soil, it may be desirable to bring the strain more nearly in the axial line of the plow-shanks, and when this is done the plows may be drawn out of the shafts to give them the required depth of penetration.

The machine may be used as a soil-breaking plow or as a subsoiling-plow, and by simply removing one or more of the plows from the shafts at suitable intervals it may be used as a cultivator, the space between the growing plants being thoroughly acted upon by the rotary plows to any depth and width. The adjustments required to convert the plow from one form of apparatus to the other are quickly and readily made, the plows may at any time be removed for repair or for the substitution of others of different size and form, and as they are impelled from bearings which lie behind their points their natural tendency will be to enter and remain in the soil. Moreover, being of the form shown, they will be drawn into the earth to a certain degree by their own rotary movement, thereby diminishing the resistance and causing the machine to run smoothly and lightly.

What I claim is—

1. The combination of a main frame having a wheeled axle, a swing-frame movable in a vertical plane, a series of axially-rotating shafts journaled on the swing-frame and carrying plows at their lower ends, a transverse shaft journaled on the swing-frame and geared to one of the ground-wheels and to all of the shafts, and lever mechanism for lifting the forward end of the swing-frame to simultaneously elevate all of the plows, substantially as described.

2. The combination of a main frame having a wheeled axle, a swing-frame movable in a vertical plane, a series of axially-rotating shafts journaled on the swing-frame, a plow having a shank continuously rotated by and telescopically connected with each rotary shaft, a transverse shaft journaled on the swing-frame and geared to one of the ground-wheels and to all of the shafts, and lever mechanism for lifting the forward end of the swing-frame to simultaneously elevate all the plows, substantially as described.

3. In a plow, the combination, with a main frame and with a plow-carrying frame having pivotal support upon the main frame, of a rock-shaft having arms provided with outwardly-turned bearings having friction-rolls which lie between keepers and the front ends of the side beams of the plow-carrying frame, said rock-shaft having a lever locked by a curved perforated bar, a series of shafts mounted on said frame and provided with miters, a transverse shaft having intermeshing miters and provided with a spur-gear upon its prolonged end meshing with a gear-annulus on one of the wheels, a series of plows having shanks inserted in the lower forward ends of the shafts, and a series of break-pins passing through apertures in the ends of the shafts and through the insertible shanks, substantially as described.

In testimony whereof I have hereunto set my hand and affixed my seal in presence of two subscribing witnesses.

GEO. P. CLEVELAND. [L. S.]

Witnesses:
 GEO. W. REA,
 JAMES A. RUTHERFORD.